E. T. PARKER.
Subsoil-Plow.
No. 7,910.
Patented Jan. 21, 1851.
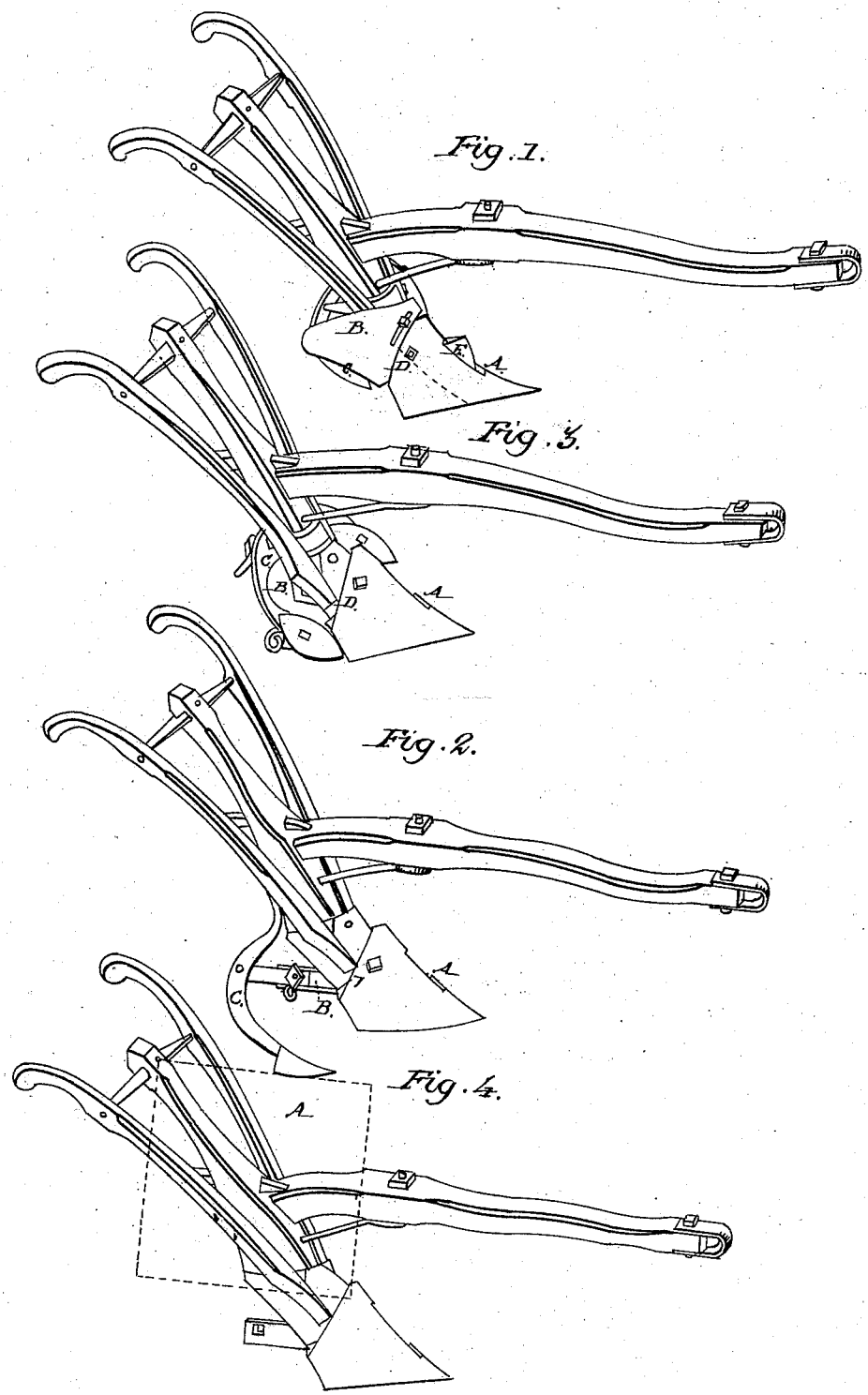

UNITED STATES PATENT OFFICE.

E. T. PARKER, OF BERKLEY, ALABAMA.

IMPROVEMENT IN CONVERTIBLE PLOW-STOCKS.

Specification forming part of Letters Patent No. 7,910, dated January 21, 1851.

*To all whom it may concern:*

Be it known that I, EDWARD T. PARKER, of Berkley in the county of Madison and State of Alabama, have invented several new and useful Improvements in Plows and Cultivators; and I do hereby declare that the following is a full, clear, and exact description of the construction and operation of the same, reference being had to the annexed drawings, making a part of this specification, in which—

Figure 1 is a perspective view of my plow with the movable mold-board attached, showing the manner in which the share and landside are fastened to the helve and the woodwork put together, &c. Fig. 2 is a perspective view of my subsoil-cultivator and the way it is fastened to the helve and landside of the share, so as to be lowered to go the required depth. Fig. 3 is a perspective view of my surface-cultivator and the manner it is fastened to the helve, and which also can be raised or lowered above or below the stay that passes from the beam through the helve.

A, Fig. 1, is the share, length thirteen inches; B, mold-board, length at top sixteen inches; C, length of mold-board at bottom, twelve inches; D, length across where the share and mold-board meet, ten inches; E, turf-cutter; A, Fig. 2, share, length thirteen inches; B, landside, length sixteen inches; C, subsoil-cultivator; A, Fig. 3, share, length thirteen inches; B, landside, length sixteen inches; C, width across cultivator from point to point sixteen inches; D, width of share, four inches; A, Fig. 4, angle of the helve of the plow and cultivator. Dimensions of woodwork, as follows: length of beam, four feet four inches; handles, four feet; helve, three feet; cross-piece, one foot six inches.

I have marked a dotted line across the share of the drawings, Fig. 1, showing the proportionable width of a share that is generally used when cultivators are on, particularly the surface-cultivator. The construction of the whole will be seen to be very simple of construction and entirely clear of the fault so common in plows and cultivators now in use—viz, their choking up and pitching in and out, &c. The beam can be framed into the helve as high up as one pleases, so the clevis end of the beam is the proper distance from the ground, which can be regulated by the screw on the end of the stay back of the helve and the key in the mortise where the beam goes through the helve.

Plows of all descriptions—that is, for any description of plowing, subsoiling, and draining and cultivating—can be made on this plan or system, by common smiths and wood-workmen in every part of the country, much cheaper than other plows now in use, and they will be much less liable to get out of fix or shackle to pieces, and I am inclined to think that they combine more of what any invention should aim to accomplish—viz, cheapness, utility, durability, and beauty—than any other system of plows made in our country, and consequently come in general use when known.

My plow and cultivator is adapted and designed for breaking up the soil and subsoil, and in cultivating it. The usual operation is to use the plow with the mold-board shoved up or taken off. In breaking up for a crop of corn, for instance, with or without the subsoil. After the corn is up it should be plowed with the subsoil-cultivator on. The first and second time, after the roots begin to spread, the surface-cultivator should be put on and the subsoil taken off, and with it the crop "laid by," as they term it here.

What I claim as my invention, and desire to secure by Letters Patent, is—

So constructing a subsoil-plow with removable mold-board and cutter, in combination with the tri-pronged cultivating-teeth, that the same stock may be used either for a subsoil-plow or common plowing and cultivating the land, as herein set forth.

EWD. T. PARKER.

Witnesses:
WM. H. T. MONROE,
D. FARISS.